United States Patent
Terada

(10) Patent No.: US 8,941,342 B2
(45) Date of Patent: Jan. 27, 2015

(54) INTEGRATED SERVO SYSTEM

(75) Inventor: Kei Terada, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 506 days.

(21) Appl. No.: 13/218,858

(22) Filed: Aug. 26, 2011

(65) Prior Publication Data
US 2013/0049670 A1 Feb. 28, 2013

(51) Int. Cl.
*H02K 29/10* (2006.01)
*H04L 12/40* (2006.01)
*H02P 6/16* (2006.01)

(52) U.S. Cl.
CPC .......... *H04L 12/40013* (2013.01); *H02P 6/165* (2013.01)
USPC .............. 318/400.4; 318/400.38; 318/400.39; 318/560; 318/721; 318/799

(58) Field of Classification Search
USPC ......... 318/560, 561, 486, 599, 721, 727, 799, 318/800, 801, 430, 432, 565, 568.18, 400.4, 318/400.38, 400.39; 388/819, 823
See application file for complete search history.

(56) References Cited

U.S. PATENT DOCUMENTS

| | | | |
|---|---|---|---|
| 5,138,815 A * | 8/1992 | Groschen, Jr. | 53/55 |
| 5,834,918 A * | 11/1998 | Taylor et al. | 318/601 |
| 5,912,541 A | 6/1999 | Bigler et al. | |
| 6,297,472 B1 * | 10/2001 | Bong et al. | 219/125.12 |
| 8,531,141 B2 * | 9/2013 | Wu et al. | 318/400.07 |

FOREIGN PATENT DOCUMENTS

| | | |
|---|---|---|
| CN | 2876847 Y | 3/2007 |
| CN | 201118372 Y | 9/2008 |
| JP | 06-038569 A | 2/1994 |
| JP | 06-311760 A | 11/1994 |
| JP | 2002-136057 A | 5/2002 |
| JP | 2004-252555 A | 9/2004 |
| JP | 2005-185044 A | 7/2005 |
| JP | 2007-089243 A | 4/2007 |
| JP | 2009-278858 A | 11/2009 |

OTHER PUBLICATIONS

Taiwanese Office Action dated Mar. 6, 2014 issued in Taiwanese Application No. 101126579.
Communication dated Sep. 24, 2014, issued by the Japanese Patent Office in counterpart Japanese application No. 2013-531118.
Korean Office Action dated Aug. 27, 2014 issued in Korean Application No. 10-2013-7032503.

* cited by examiner

*Primary Examiner* — Antony M Paul
(74) *Attorney, Agent, or Firm* — Sughrue Mion, PLLC; Richard C. Turner

(57) ABSTRACT

An integrated servo system and a method of controlling a motor is provided. The integrated servo system includes a position detector which determines original position data of a motor and a position signal processor which determines a position of the motor based on the determined position data. The integrated servo system further includes a servo controller circuit which controls the motor based on the determined position data and a parallel bus through which the determined position data is transmitted from the position signal processor to the servo controller circuit.

12 Claims, 3 Drawing Sheets

INTEGRATED SERVO SYSTEM

BACKGROUND

1. Field of the Invention

Apparatuses and methods consistent with the present invention relate to a system for motor position detection and velocity control.

2. Description of the Related Art

Servomotors are used in control systems for driving various mechanical loads in machine tools, etc. It is desirable to accurately control the velocity of the motor.

A conventional servo system is described with reference to FIG. 1. The servo system includes an electrical supply (mains electricity) 1, a servo amplifier 100, a motor 11, and an encoder 200. The mains electricity 1 supplies alternating current such as three-phase electric power of 200 V to the servo amplifier through power line 5.

The servo amplifier 100 includes a converter circuit 6 that rectifies the alternating current input from the power line 5 and generates a direct current with a voltage of 280V. The direct current is output to an inverter circuit 10. The inverter circuit 10 generates a voltage and supplies three phase electric power to the motor 11 via a power line 12. This voltage is generated according to the direct current input from the power line 7 and other feedback information.

The position of the motor 11 is monitored by a position detector 13 in the encoder 200. It is common that the motor 11 revolves planetary gears when the motor 11 is driven and the position detector 13 has an optical rotary encoder to detect optical pulses created by laser or light through the gear. By counting the number of pulses, the position detector 13 detects the position of the motor 11. A signal processing IC 51 encodes this position data and sends the encoded position data to a serial sender 52, which relays this information to a serial receiver 53 via a serial bus 59. Based on the received position information, the servo amplifier determines a velocity of the motor 11 using a velocity processor 54. A velocity controller 56 instructs an electric current controlling IC 55 (hereinafter, "IC 55") to control the inverter circuit 10 based on the velocity output by the velocity processor 54. That is, the velocity controller 56 instructs the electric current controlling IC to increase or decrease the intensity of its output to the inverter circuit 10. Specifically, the velocity controller 56 provides an electrical current command (torque command) to the IC 55. The IC 55 also receives real motor feedback current from the inverter circuit 10. The IC 55 then compares the electric current command and current feedback received from the inverter circuit 10 and generates a voltage command based on the comparison. Based on the generated voltage command, a PWM signal is generated and provided it to the inverter circuit 10.

The inventor has identified the following problem with the above conventional system. Because the bandwidth of the serial bus 59 is limited, the servo amplifier 100 and the encoder 200 must wait until all the position data is transferred by the serial bus. While the servo amplifier 100 waits to receive the positional data from the encoder 200, the position of the servo motor 11 changes from the position represented by the positional data. As a result, the current position of the motor 11 as calculated by the servo amplifier 100 in the conventional technology contains some delays. And because of the transferring time of the serial bus, position data in the servo amplifier has some discrete time errors. Furthermore, the velocity data is calculated from the position data by using differential operation. Accordingly, the velocity data contains considerable errors and delays due to the errors and delays in the position data. Since the velocity data is used for velocity feedback control, errors, and delays in the velocity calculation may cause control instability that may result in a degradation of the servo performance and might deteriorate the productivity of, e.g., a manufacturing line.

Accordingly, a system is needed which would allow for a more real-time determination and subsequent control of the motor velocity.

The conventional system 1000 of FIG. 1 further includes a motion controller 4 that generates instructions to control the servo system based on programs written by users and executed at the motion controller 4 itself. These instructions are sent to the servo amplifier 100 via a motion control communication line 8 as digital or analog signals. The motion control communication line 8 can be embodied using various types of network connectivity such as Ethernet or dedicated serial communication. A position controller 57 instructs the velocity controller 56 of the desired velocity as instructed by the motion controller.

SUMMARY

Exemplary embodiments of the present invention address one or more of the above problems and/or disadvantages and other disadvantages not described above. However, the invention is not required to overcome the disadvantages described above, and an exemplary embodiment of the present invention may not overcome any of the problems listed above.

An exemplary integrated servo system for controlling a motor is provided. The integrated servo system includes a position detector which determines original position data of a motor and a position signal processor which determines a position of the motor based on the determined position data. The integrated servo system further includes a servo controller circuit which controls the motor based on the determined position data and a parallel bus through which the determined position data is transmitted from the position signal processor to the servo controller circuit.

Further, an exemplary method of controlling a motor is provided. The method includes determining position data of the motor including a current position of the motor and transmitting, through a parallel bus, the determined position data to a servo controller circuit. The method further includes receiving the determined position data at the servo controller circuit and controlling the motor based on the received position data.

BRIEF DESCRIPTION OF THE DRAWINGS

The above and/or other aspects of the present invention will be made more apparent by describing certain exemplary embodiments of the present invention with reference to the accompanying drawings, in which.

DETAILED DESCRIPTION OF EXEMPLARY EMBODIMENTS

Figure 1:
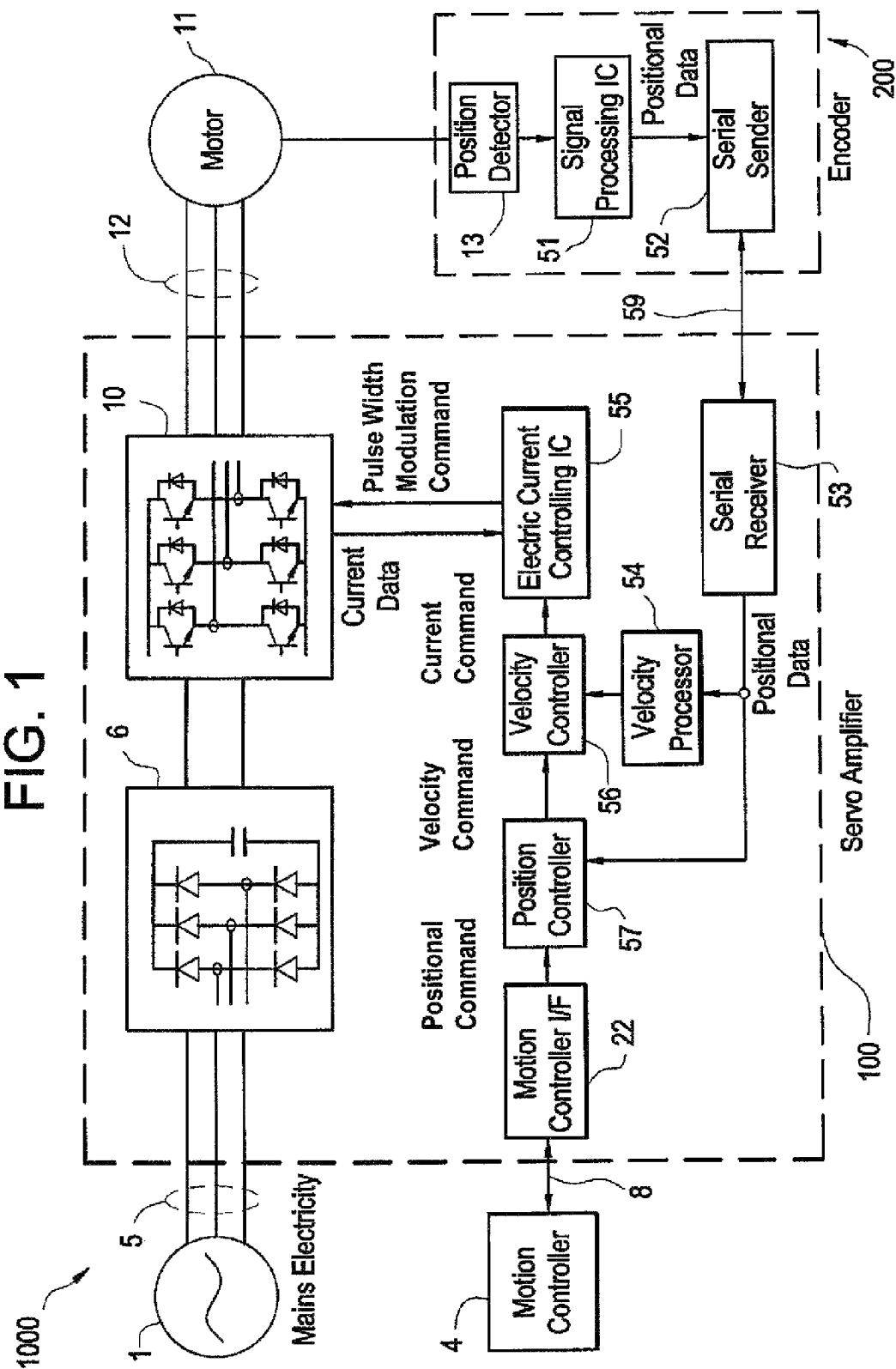
FIG. 1 illustrates a conventional motor system.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

According to an exemplary embodiment of the present disclosure, a motor control system 2000 is provided including an integrated servo system 3. Some of the components such as the inverter circuit 10, motor 11, position detector 13, and electric current controlling IC 19 are similar to those described in FIG. 1. The servo system 3 includes a servo controller circuit 15 that controls a position and velocity of the motor 11.

In the servo system 3, the position of the motor 11 is detected by the position detector 13 and output to a position signal processor 14, which calculates the motor velocity. The velocity calculated by the position signal processor 14 is output to the servo controller circuit 15 via a parallel bus 16 instead of a serial bus (as described in FIG. 1).

The position signal processor 14 calculates the velocity of the motor 11 based on the position of the motor 11. Namely, the position signal processor 14 obtains differences among positions of the motor at predetermined intervals and determines the velocity according to the position differences. The position information and/or the velocity data is then transmitted to the servo controller circuit 15 via the parallel bus 16.

Because the servo system of this exemplary embodiment employs the parallel bus 16 with larger bandwidth and higher speed than that of a serial bus, the positional data and/or velocity data can be transferred at a higher frequency to the servo controller circuit 15 so that the transferred data is more real-time. In addition, because the parallel bus 16 transfers data fast, it can send even the velocity calculated in the position signal processor 14 without slowing the transfer rate of positional data. The positional data is sent back to the servo controller circuit 15 for position control purposes.

The motor system 2000 further includes the motion controller 4 similar to FIG. 1. The motion controller 4 provides requests to control the servo system 3 and sends these requests to the converter unit 2. The motion controller 4 requests are received at the motion controller interface circuit 22 of the converter unit 2 and then those requests are transferred to a processing unit 23 of the converter unit 2. The processing unit 23 creates instruction signals to control the converter unit 6 so that the converter unit 6 adaptively changes the intensity of the direct current it generates, according to the requests received through the motion controller interface 22. The intensity change may include a change in voltage or current or both. Also, the processing unit 23 creates instructions for the integrated servo system 3 to control the feedback circuit including the inverter 10, the motor 11, the position detector 13, the positional signal processor 14, and the servo controller circuit 15. The instructions created by the processing unit 23 are sent from an inverter interface circuit 24 via the converter-inverter communication line 21. It should be noted that the communication line 21 is used to transfer position/velocity command from the motion controller 4 to the servo controller circuit 15. The communication line 21 is also used to transfer real motor position/velocity/current monitor data and other status data from servo controller 15 to motion controller 4.

Another distinguishing feature of the present exemplary embodiment over conventional technology is the integration of some of the elements of the servo amplifier 100 with the motor itself. For example, velocity processing and control circuit (the inverter unit 10, electric current controlling IC 55, velocity controller 56, velocity processor 54) have been integrated with the motor and the position detection circuit to provide an integrated servo system 3 as described in FIG. 2. In the past, the motor was separated from the servo system by long cables, which would add to the delay in conveying the positional data to the controlling circuits in the servo system. By providing an integrated servo system and a parallel data link between the servo controller circuit 15 and position signal processor 14, the delay time between position detection and transmission to circuitry that controls the motor can be reduced significantly. Further, elements which control the motor velocity, position, acceleration, etc can be provided on the same circuit board with the circuit elements that determine the position and velocity.

It should be noted that the servo controller circuit 15, position detector 13, and the position signal processor 14 may be implemented using a processor. Additional details on the servo controller circuit are set forth next.

The servo controller circuit 15 has a dual port memory 17 and a processing unit 18, an electric current controlling circuit 19, and a converter interface unit 20. The position detected by the position detector 13 and the velocity calculated by the position signal processor 14 are stored in the dual port memory 17 after they are transferred via the parallel bus 16. The dual port memory 17 allows asynchronous access from a processing unit 18. The processing unit 18 is configured to generate instructions to the electric current controlling IC (integral circuit) 19 based on the position and the velocity of the motor 11. The electric current controlling IC 19 controls the inverter circuit 10 based on the instructions from the processing unit 18. The processing unit 18 provides instructions to the electric current controlling IC 19 according to information received via the converter interface 20. The converter interface 20 is a circuit configured to receive information transferred through a converter-inverter communication line 21. The converter-inverter communication line 21 can be embodied using various known network connectivity such as Ethernet or universal serial bus.

Exemplarily, the parallel bus 16 may have a bus width greater than or equal to the size of resolution of the position data where the bus width and the size of the resolution of the position data are measured in number of bits. Furthermore, a board which mounts the position signal processor 14 and a board which mounts the servo controller circuit 15 may be connected by a cable which is less than 20 cm in length. Additionally, the velocity data may be calculated in the servo controller circuit 15 instead of being calculated in the position signal processor 14 since the provision of the parallel bus 16 allows for the position data to be transmitted to the servo controller circuit 15 to be transmitted without significant errors and delays.

Figure 2:
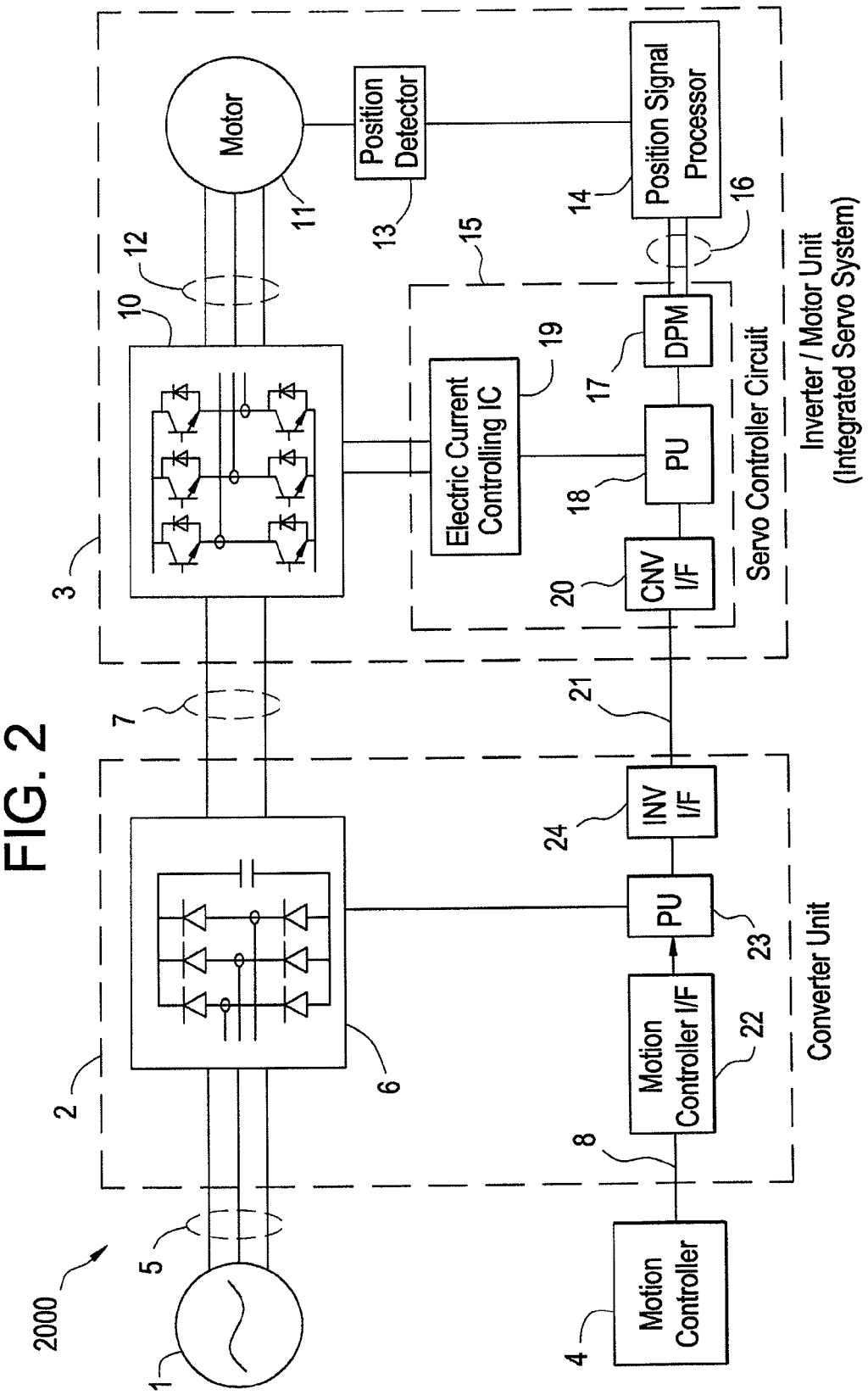
FIG. 2 illustrates an exemplary motor system according to the present disclosure.
Figure 3:
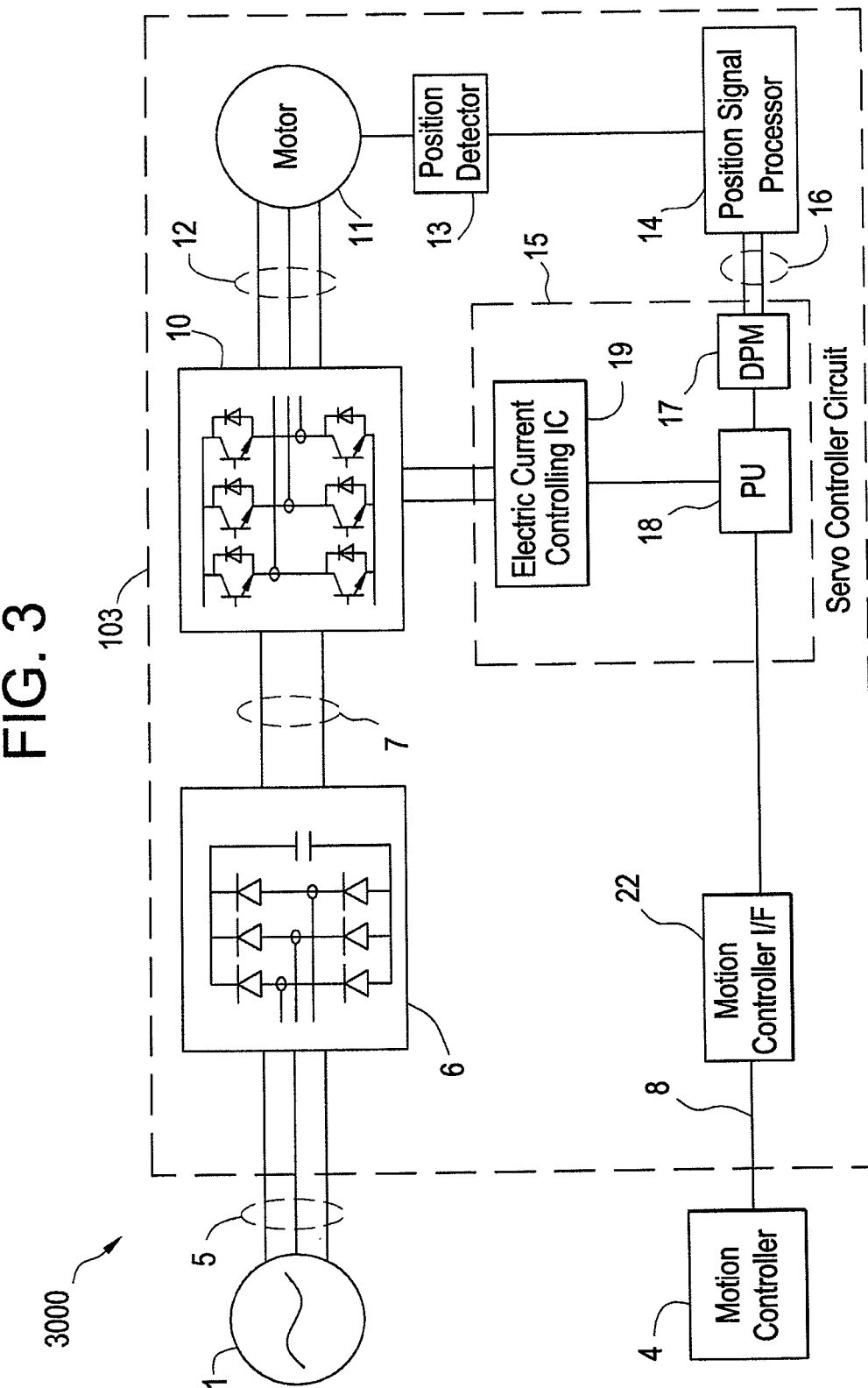
FIG. 3 illustrates another exemplary motor system according to the present disclosure.

Another exemplary implementation of a motor control system 3000 is described with reference to FIG. 3. In this implementation, the converter unit 2 of FIG. 2 is integrated with the servo system 3 of FIG. 2 resulting in an integrated servo system 103. Most of the elements of the motor control system 3000 are similar in functionality to the motor control system 2000. For example, the motor control system 3000 includes the electrical supply 1, the motion controller 4, motor 11, position detector 13, position signal processor 14, servo controller circuit 15, inverter circuit 10, motion controller interface 22, etc.

In the above exemplary implementation, space for a converter unit is not needed in an electrical cabinet and hence, the electrical cabinet can be reduced in size. Further, the only incoming power line cable is the AC power line 5. Accordingly, wiring can be made easier and the probability of miswiring can be decreased.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An integrated servo system including:
    a position detector which determines original position data of a motor;
    a position signal processor which determines a position of the motor based on the determined position data;
    a servo controller circuit which controls the motor based on the determined position data; and
    an encoder communication unit provided as a parallel bus used as an exclusive means for directly transmitting the determined position data from the position signal processor to the servo controller circuit.

2. The integrated servo system of claim 1, wherein the position signal processor determines velocity data of the motor from the position data and the determined velocity data is transmitted to the servo controller circuit along with the determined position data through the encoder communication unit.

3. The integrated servo system of claim 1, wherein a bus width of the encoder communication unit as measured in a number of bits is greater than or equal to a size of the determined position data as measured in a number of bits.

4. The integrated servo system of claim 1, wherein the encoder communication unit connects to a dual port memory in the servo controller circuit.

5. The integrated servo system of claim 1, wherein a board which mounts the position signal processor and a board which mounts the servo controller circuit are connected by a cable which is less than 20 cm in length.

6. The integrated servo system of claim 1, wherein the position detector, position signal processor, servo controller circuit, and the encoder communication unit are provided on a same mounting board.

7. The integrated servo system of claim 1, wherein the position detector, the position signal processor, the servo controller circuit, and the encoder communication unit are provided on a same chip.

8. A motor system comprising:
    a converter unit; and
    the integrated servo system of claim 1,
    wherein:
    the converter unit provides position control or velocity control commands to the integrated servo system.

9. A method of controlling a motor, the method comprising:
    determining position data of the motor including a current position of the motor;
    transmitting, through an encoder communication unit provided as a parallel bus used as an exclusive means for directly transmitting, the determined position data to a servo controller circuit;
    receiving the determined position data at the servo controller circuit; and
    controlling the motor based on the received position data.

10. The method of claim 9, further comprising:
    determining velocity data of the motor from the position data; and
    transmitting the determined velocity data to the servo controller circuit along with the determined position data through the encoder communication unit.

11. The method of claim 9, wherein a bus width of the encoder communication unit as measured in number of bits is greater than or equal to a size of the determined position data as measured in a number of bits.

12. The method of claim 9, wherein the encoder communication unit connects to a dual port memory in the servo controller circuit.

* * * * *